United States Patent
Agemizu et al.

(10) Patent No.: US 10,379,282 B2
(45) Date of Patent: Aug. 13, 2019

(54) MULTICOLOR DISPLAY APPARATUS AND METHOD FOR SETTING GRADATION VALUE OF MULTICOLOR DISPLAY APPARATUS

(71) Applicant: Panasonic Intellectual Property Management Co., Ltd., Osaka (JP)

(72) Inventors: Wahei Agemizu, Osaka (JP); Kazumasa Takata, Osaka (JP); Kenji Takamoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 333 days.

(21) Appl. No.: 15/426,057

(22) Filed: Feb. 7, 2017

(65) Prior Publication Data
US 2017/0363792 A1 Dec. 21, 2017

(30) Foreign Application Priority Data

Jun. 15, 2016 (JP) .................. 2016-118417

(51) Int. Cl.
*F21V 8/00* (2006.01)
(52) U.S. Cl.
CPC ........... *G02B 6/006* (2013.01); *G02B 6/0036* (2013.01); *G02B 6/0068* (2013.01)
(58) Field of Classification Search
CPC ..... G02B 6/006; G02B 6/0036; G02B 6/0068
See application file for complete search history.

(56) References Cited

U.S. PATENT DOCUMENTS 8,462,292 B2   6/2013  Parker et al.
2001/0049893 A1* 12/2001 Maas ................... G02B 6/0036
                                                                40/544
(Continued)

FOREIGN PATENT DOCUMENTS

JP          4-246683      9/1992
JP          2011-064959   3/2011
(Continued)

*Primary Examiner* — Anh T Mai
*Assistant Examiner* — Michael Chiang
(74) *Attorney, Agent, or Firm* — Panasonic IP Management; Kerry S. Culpepper

(57) ABSTRACT

A multicolor display apparatus displays a design pattern by reflecting light beams which are incident into a light guide body by arrays of fine shapes and emitting the reflected light beams from the light emission surface, in which, when it is assumed that the gradation values of red, green, blue, and white at a point where a specific color (to be displayed) of the design pattern of the light guide body is displayed using red, green, blue, and white light are set as I(r), I(g), I(b), and I(w), respectively, and when it is assumed that the gradation values of red, green, and blue in the case of displaying a color close to the specific color using only red, green, and blue light without white light are set as Ir, Ig, and Ib, respectively, the fine shapes for each of red, green, blue, and white colors have a height or a pitch which corresponds to the gradation values I(r), I(g), I(b), and I(w) as follows: I(w)=min(Ir, Ig, Ib)×A/100; I(r)=Ir−I(w); I(g)=Ig−I(w); I(b)=Ib−I(w). Here, A/100 is less than 1. Thus, it is possible to realize a beautiful white color and realize display which has high color reproducibility without influence due to a machining error and allows a user to feel beautiful.

9 Claims, 12 Drawing Sheets

(56) References Cited

U.S. PATENT DOCUMENTS

| | | | | |
|---|---|---|---|---|
| 2008/0252797 | A1* | 10/2008 | Hamer | G09G 3/3208 |
| | | | | 348/802 |
| 2009/0073721 | A1* | 3/2009 | Kamikatano | F21V 7/05 |
| | | | | 362/616 |
| 2011/0148910 | A1* | 6/2011 | Botzas | G09G 5/02 |
| | | | | 345/600 |
| 2012/0051088 | A1* | 3/2012 | Chui | G02B 6/0036 |
| | | | | 362/608 |
| 2012/0268353 | A1 | 10/2012 | Mizukoshi et al. | |
| 2013/0265802 | A1* | 10/2013 | Kamikatano | G09F 13/18 |
| | | | | 362/607 |
| 2015/0293296 | A1* | 10/2015 | Kikuchi | G02B 6/0051 |
| | | | | 362/606 |
| 2017/0039920 | A1* | 2/2017 | Li | G09G 3/32 |
| 2017/0115441 | A1* | 4/2017 | Takata | G02B 6/002 |

FOREIGN PATENT DOCUMENTS

| | | |
|---|---|---|
| WO | 2007/123202 | 11/2007 |
| WO | 2016/035228 | 3/2016 |

* cited by examiner

FIG. 9A
FIG. 9B
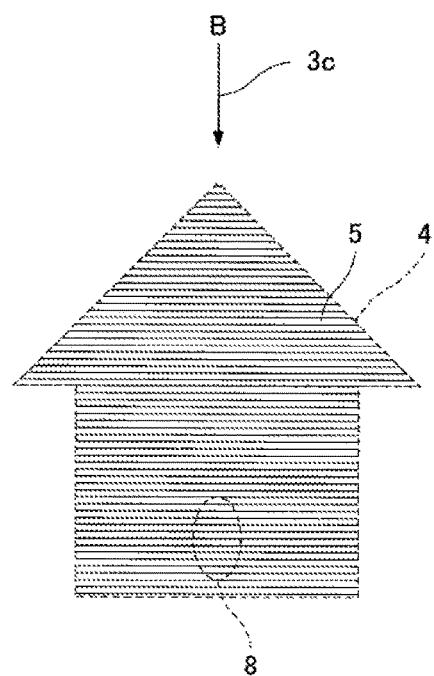
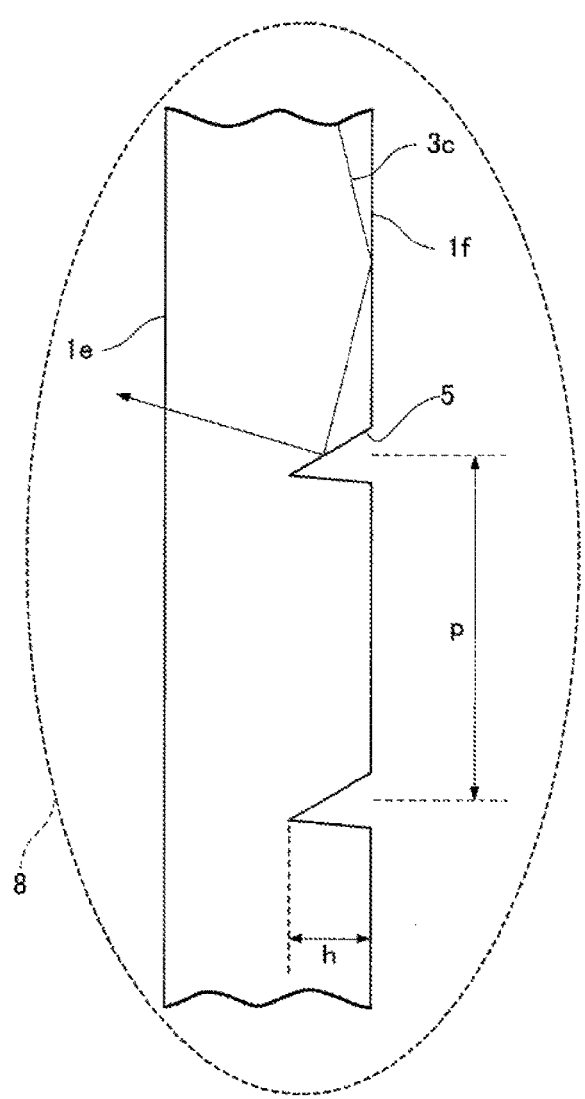

(a)

(b)

MULTICOLOR DISPLAY APPARATUS AND METHOD FOR SETTING GRADATION VALUE OF MULTICOLOR DISPLAY APPARATUS

TECHNICAL FIELD

The technical field relates to a multicolor display apparatus that displays a color design by a plurality of color light beams which are incident into a light guide body, and a method for setting a gradation value of the multicolor display apparatus.

BACKGROUND

In Japanese Patent Unexamined Publication No. 4-246683, a multicolor display apparatus is disclosed.

As illustrated in FIG. 16, in the multicolor display apparatus, lamps 11A to 11F with different emission colors are disposed on the ridgeline side surfaces of light guide body 10. As lamps 11A to 11F are appropriately controlled by a power supply 14 through lighting circuits 12A to 12F and a control circuit 13, color light beams emitted from lamps 11A to 11F are incident into light guide body 10. Thus, a display body 15 disposed on light guide body 10 as a design pattern is displayed in multiple colors.

In the relationship between the ridgeline side surfaces of light guide body 10 and the emission colors of lamps 11A to 11F, the lamps of the same color system are disposed on the sides opposite to the ridgeline side surfaces of light guide body 10. For example, lamps 11A and 11D have a red emission color, lamps 11B and 11E have a blue emission color, and lamps 11C and 11F have a green emission color.

As described above, in the related art, red, green, and blue light beams emitted from lamps 11A to 11F with different emission colors are incident into light guide body 10, and the incident light beams are mixed with each other, thereby displaying colors with multicolor.

In a case where display body 15 is expressed with a sky color to be displayed, display body 15 can be expressed by mixing green color and blue color among red, green and blue colors which are three primary colors of light. In a case where display body 15 is expressed with a white color, display body 15 can be expressed by mixing red, green and blue colors.

However, in the case of expressing a white color, when there is a difference in the intensity of the incident color light beams, a white color is likely to be recognised as a different color. In a case where the light intensity of red light is higher than that of green light or blue light, display body 15 is displayed in a pink color rather than a white color.

In the case of expressing a sky color, even though there is a difference in intensity between green light and blue light, the difference in color is less noticeable compared to the case of a white color.

In the case of multicolor expression, the beauty of the color, that is, high color reproducibility is required. However, in a case where a white color is viewed as a different color due to the difference in the intensity between the incident color light beams, it is difficult to express a beautiful white color.

SUMMARY

An object of an embodiment is to provide a multicolor display apparatus that can realize a beautiful white color, and that can realise multicolor display or color display which has high color reproducibility without influence due to a machining error and allows a user to appreciate a beautiful display.

A multicolor display apparatus according to an embodiment includes: a light guide body on which a design pattern is formed by arrays of fine shapes; and light sources from which red, green, blue, and white light beams are incident into the inside of the light guide body, in which the multicolor display apparatus displays the design pattern by reflecting the light beams which are incident into the light guide body and guided by the arrays of fine shapes and emitting the reflected light beams from the light emission surface of the light guide body, and in which, when it is assumed that the gradation values of red, green, blue, and white at a point where a specific color of the design pattern of the light guide body is displayed using red, green, blue, and white light are set as I(r), I(g), I(b), and I(w), respectively, and when it is assumed that the gradation values of red, green, and blue in the case of displaying a color close to the specific color using only red, green, and blue light without white light are set as Ir, Ig, and Ib, respectively, the fine shapes for each of red, green, blue, and white colors have a height or a pitch which corresponds to the gradation values as follows, $$I(w)=\min(Ir,Ig,Ib)\times A/200$$

$$I(r)=Ir-I(w)$$

$$I(g)=Ig-I(w)$$

$$I(b)=Ib-I(w)$$

(here, in a case where a maximum gradation value is set as 100%, when all of Ir, Ig, Ib are equal to or greater than a set gradation value around 20%, A/100 being Less than 1).

A method for setting gradation values of a multicolor display apparatus according to an embodiment includes: providing a light guide body on which a design pattern is formed by arrays of fine shapes; providing light sources from which red, green, blue, and white light beams are incident into the inside of the light guide body; at the timing of setting the fine shapes for displaying the design pattern with a specific color by reflecting the light beams which are incident into the light guide body and guided by the arrays of fine shapes and emitting the reflected light beams from the light emission surface of the light guide body, when it is assumed that the gradation values of red, green, and blue in the case of displaying a display color close to the specific color using only red, green, and blue light inside the light guide body are set as Ir, Ig, and Ib, respectively, and when it is assumed that the gradation values of red, green, blue, and white in the case of displaying the specific color using red, green, blue, and white light inside the light guide body are set as I(r), I(g), I(b), and I(w), respectively, converting the gradation values Ir, Ig, and Ib into the gradation as follows, $$I(w)=\min(Ir,Ig,Ib)\times A/100$$

$$I(r)=Ir-I(w)$$

$$I(g)=Ig-I(w)$$

$$I(b)=Ib-I(w)$$

(here, in a case where a maximum gradation value is set as 100%, when all of Ir, Ig, Ib are equal to or greater than a set gradation value around 20%, A/100 being less than 1); and converting the converted gradation values into a height or a pitch of the fine shapes, and forming the design pattern based on the height or the pitch of the fine shapes.

According to the embodiment, the fine shapes are formed on the light guide body so as to have a height or a pitch which corresponds to the red, green, blue, and white gradation values I(r), I(g), I(b), and I(w) as follows: I(w)=min (Ir, Ig, Ib)×A/100; I(r)=Ir−I(w); I(g)=Ig−I(w); and I(b)=Ib−I(w). Therefore, in a case where the design pattern of the light guide body is displayed using red, green, blue, and white colors, it is possible to realize a beautiful white color and realise color display which has high color reproducibility without influence due to a machining error and allows a user to appreciate the beautiful display, compared to a case where the fine shapes are formed on the light guide body so as to have a height or a pitch which corresponds to the red, green, blue, and white gradation values I(r), I(g), I(b), and I(w) obtained by the basic conversion as follows: I(w)=min(Ir, Ig, Ib); I(r)=Ir−I(w); I(g)=Ig−I(w); and I(b)=Ib−I(w).

BRIEF DESCRIPTION OF THE DRAWINGS

FIG. 9A is a plan view illustrating light incident directions for a blue color arrangement of the design pattern in the embodiment 1.

FIG. 9B is an enlarged sectional view illustrating the fine shapes formed en the light guide body.

DESCRIPTION OF EMBODIMENTS

Hereinafter, embodiments described herein will be described with reference to the drawings.

Embodiment 1

Figure 1:
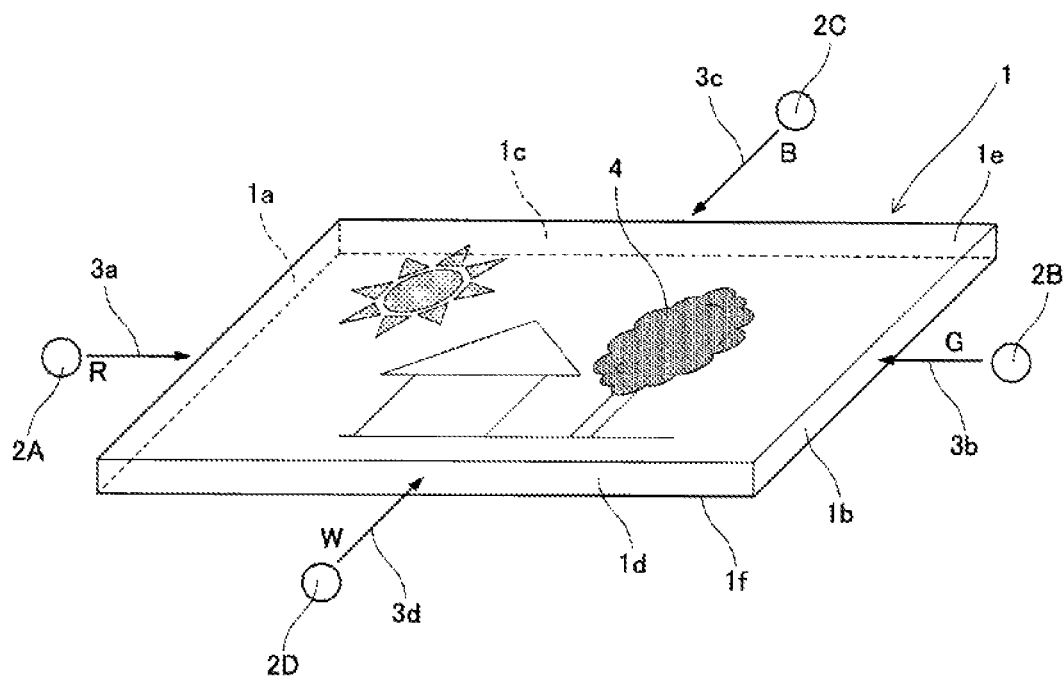
FIG. 1 is a perspective view of a multicolor display apparatus according to an embodiment 1.

FIG. 1 illustrates: a multicolor display apparatus according to an embodiment 1.

The multicolor display apparatus includes light guide body 1 and light sources 2A, 2B, 2C, and 2D that emit light beams of different emission colors.

Light guide body 1 has side surface 1a into which light from light source 2A is incident, side surface 1b into which light from light source 2B is incident, side surface 1c into which light from light source 2C is incident, side surface 1d into which light from light source 2D is incident, light emission surface 1e from which light is emitted, and rear wall surface 1f which is opposite to light emission surface 1e.

In light sources 2A, 2B, and 2C, light 3a emitted from light source 2A is red, light 3b emitted from light source 2B is green, and light 3c emitted from light source 2C is blue. The light emitted from light source 2D is white light 3d whose color is different from that of light sources 2A, 2B, 2C.

Figure 2:
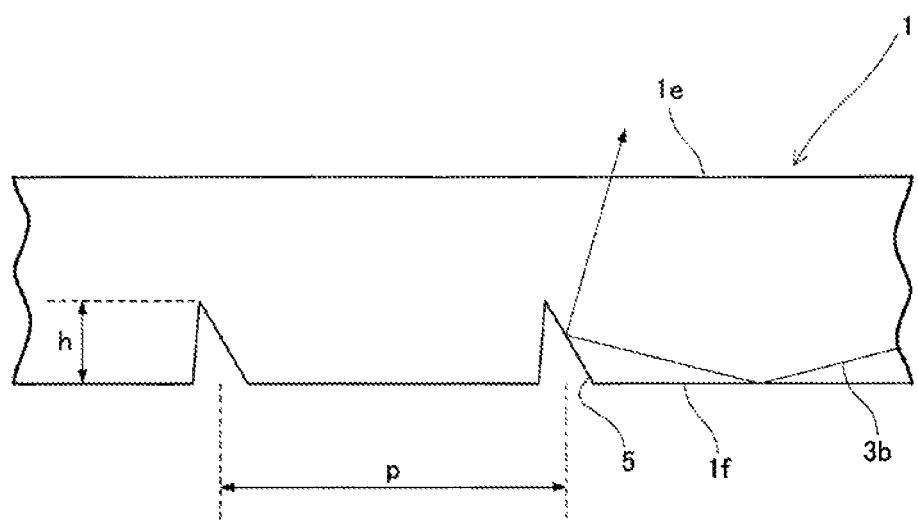
FIG. 2 is an enlarged sectional view of a light guide body of the embodiment 1.

FIG. 2 illustrates an enlarged sectional view of light guide body 1.

An array of fine shapes 5 is formed on rear wall surface 1f of light guide body 1 according to design pattern 4. Fine shapes 5 are formed so as to reflect light that is incident into the inside, of light guide body 1 to light emission surface 1e according to desired design pattern 4 to be displayed. Fine shape 5 has an approximately asymmetric triangular shape section that is perpendicular to light emission, surface 1e, and reflects the light from a specific direction toward light emission surface 1e. Here, design pattern 4 is a landscape pattern including pictures of a house, a tree, and a sun floating in the sky.

Since four light sources with different emission colors are used as light sources of this embodiment, fine shapes 5 are provided for the emission color of each of light sources according to a color arrangement of design pattern 4 as described later. The light intensity of the light from, each light source that is reflected by each of fine shapes 5 and emitted from light emission surface 1e of light guide body 1 corresponds to the gradation of display of the emission color.

In order to display a specific color to be displayed at a certain, point of design pattern 4 to be displayed in color using the light sources of red, green, blue, and white, since this case, is different from the case of displaying using the light sources of red, green, and blue which are three primary colors of light, in fine shape 5 of each color of light guide body 1, it is necessary to convert the gradation value of each color in the case of displaying using the light sources of red, green, and blue into an appropriate gradation value of each color in the case of displaying using the light sources of red, green, blue, and white.

COMPARATIVE EXAMPLE

Figure 3:
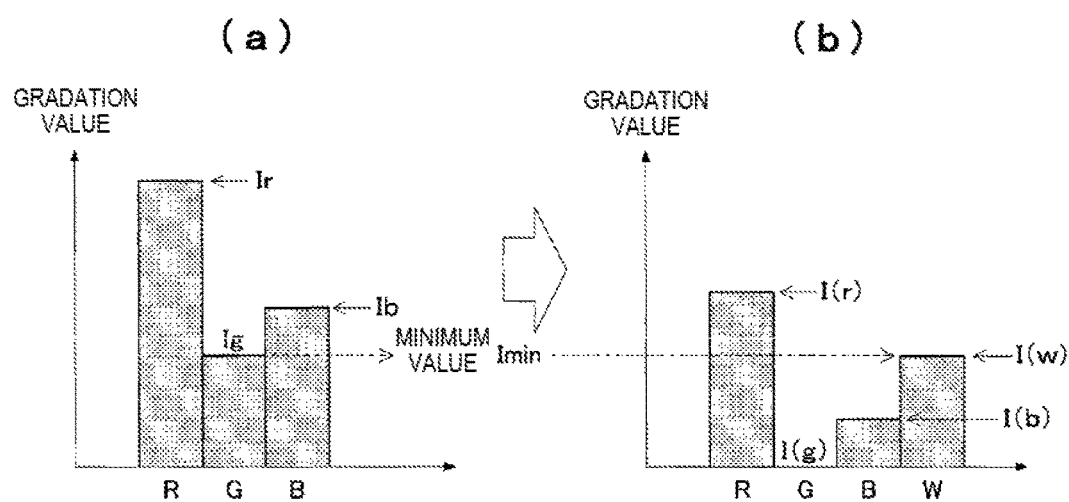
FIG. 3 is a diagram for explaining: (a) display colors of R, G, and B gradation values; and (b) R, G, R, and W gradation values in a comparative example.

It is assumed that the gradation values of red, green, and blue in the case of displaying a display color close to the specific color using only red, green, and blue light without white light are set as Ir, Ig, and Ib, respectively, illustrated in FIG. 3. The smallest gradation value among Ir, Ig, and Ib is expressed as min (Ir, Ig, Ib). In the case of FIG. 3, min. (Ir, Ig, Ib)=Ig.

In order to convert these gradation values into gradation values of red, green, blue and white, in this comparative example, as illustrated in FIG. 3, the white gradation value I(w) is set to min(Ir, Ig, Ib). The red gradation value I(r) is set to Ir−I(w) obtained by subtracting I(w) from the red gradation value Ir. The green gradation value I(g) is set to Ig−I(w) obtained by subtracting I(w) from the green gradation value Ig. In the case of FIG. 3, the green gradation value I(g) becomes zero. The blue gradation value I(b) is set to Ib−I(w) obtained by subtracting I(w) from the blue gradation value Ib.

In this way, the gradation values I(r), I(g), and I(b) are set by subtracting the white gradation value I(w) from the gradation values Ir, Ig, and Ib. The gradation values I(r), I(g), and I(b) are converted into the height or the pitch of fine shapes by dividing the gradation values by the component of each of red, green, blue, and white, and design pattern 4 is formed on light guide body 1 in a shape according to the height or the pitch of fine shapes.

The light that is incident into the light guide body and guided is reflected by the array of fine shapes 5, and emitted from the light emission surface of the light guide body. Thus, it is possible to display a white color in a color arrangement of the design pattern to a more beautiful white color than a white color in the related art, and it is possible to realise color display which has color reproducibility higher than that of the related art and allows a user to appreciate the beautiful display.

However, in the color separation method of this comparative example, the red component, the green component, or the blue component of the newly set gradation values I(r), I(g), and I(b) decrease. In the ease illustrated in FIGS. 4A and 4B, there remains a problem that the hue changes.

Figure 4A:
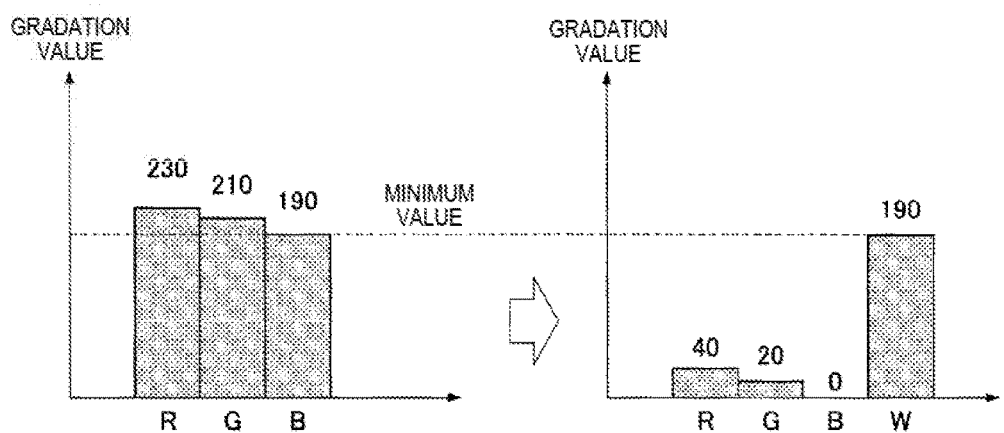
FIG. 4A is a diagram for explaining display colors of R, G, and B gradation values and for explaining a comparative example in which R, G, and B gradation values are converted into R, G, B, and W gradation values.
Figure 4B:
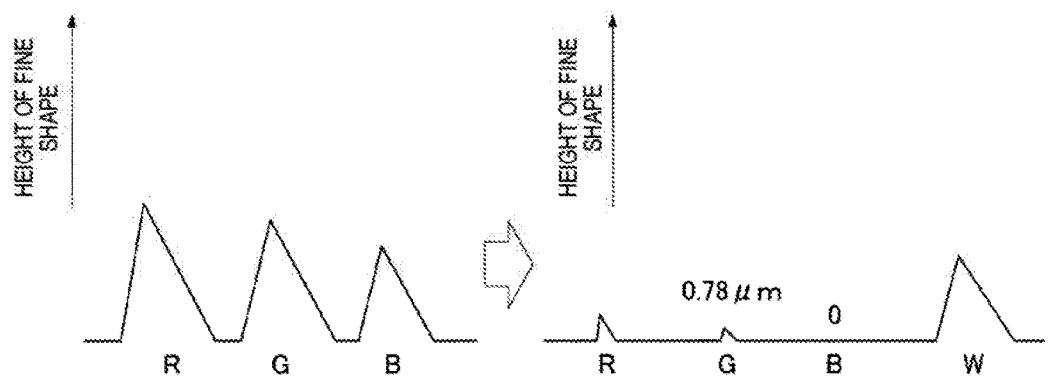
FIG. 4B is a diagram for explaining the height of fine shapes provided on the light guide body in the case of display colors of R, G, and B gradation values and for explaining the height of the fine shapes provided on the light guide body in a comparative example in which R, G, and B gradation, values are converted into R, G, B, and W gradation values.

In a case where the maximum of the gradation values Ir, Ig, Ib of each color of design pattern 4 is 256 gradations, as illustrated in FIG. 4A, assuming that Ir=230, Ig=210, and Ib=190, respectively, as illustrated in the left diagram of FIG. 4B, fine shapes 5 having a height corresponding to the R, G, and B gradation values are formed on light guide body 1. However, the R, G, B, and W gradation values in the comparative example are set as white gradation value I(w)=190, red gradation value I(r)=40, green gradation value I(g)=20, and blue gradation value I(b)=0. Assuming that, in light guide body 1 having a size of 210 mm×297 mm×3 mm, 255 level of 256 gradation corresponds to the height of the fine shape of 10 μm, since the green gradation value I(g) corresponds to 20 level of 256 gradation, as illustrated in the right diagram of FIG. 4B, the height of the fine shape is 10 μm×20/256=0.78 μm. When machining the fine shape having a height of 0.76 μm, a machining error of several microns may occur that cannot be prevented even though machining with high accuracy. As described above, since it is difficult to accurately form, fine shape 5 having a height on light guide body 1, there is a high possibility that a desired hue cannot be displayed at a portion where the gradation value of light guide body 1 is low.

As a result, in a case where the component difference between red, green, and blue is small, even though, white is clearly displayed, due to the influence of the machining error of fine shape 5, there remains a problem that another color, in this example, green light is not emitted from light guide body 1 and thus the hue changes.

EXAMPLE

In the embodiment 1, even though design pattern 4 has a portion where the component difference between red, green and blue is small, fine shape 5 of light guide body 1 is configured as follows so as to realize a beautiful white color and realize multicolor display or color display which has high color reproducibility without influence due to the machining error and allows a user to feel beautiful.

Figure 5:
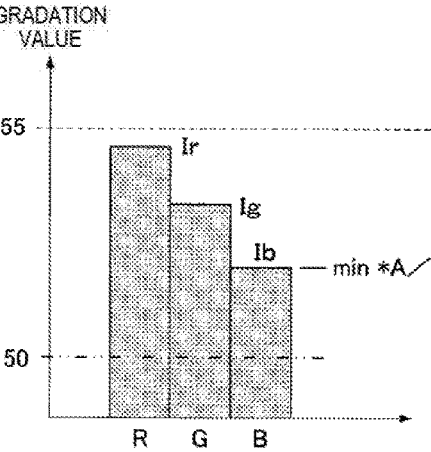
FIG. 5 is a diagram for explaining: (a) the gradation values Ir, Ig, and Ib of the display color in a case where all of the gradation value are equal to or greater than the set gradation value 50 within the maximum gradation value 255; and (b) that the R, G, and B gradation values are converted into the R, G, B, and W gradation values I(r), I(g), I(b), and I(w).
Figure 5:
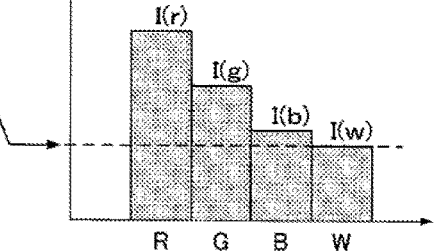

In fine shape 5 for displaying the specific color with red, green, blue, and white light, it is assumed that the gradation values of red, green, and blue in the case of displaying a display color close to the specific color using only red, green, and blue light without white light are set as Ir, Ig, and Ib, respectively, as illustrated in FIG. 5. The smallest gradation value among Ir, Ig, and Ib is expressed as min(Ir, Ig, Ib). In FIG. 5, min(Ir, Ig, Ib) is Ib.

In the embodiment 1, instead of setting Ib=I(w) as in the basic color separation method, as illustrated in FIG. 5, the gradation values I(r), I(g), I(b), and I(w) of red, green, blue, and white in the case of displaying the specific color with red, green, blue, and white light are set as follows.

$$I(w) = \min(Ir, Ig, Ib) \cdot A/100$$
$$= Ib \cdot A/100$$

Here, A is a numerical value less than 100 that varies depending on the distribution of the gradation values Ir, Ig, and Ib. A/100 is less than 1.

The red gradation value I(r) is set by subtracting the white gradation value I(w) from, the red gradation value Ir as follows.

$$I(r)=Ir-I(w)$$

The green gradation value I(g) is set by subtracting the white gradation value I(w) from the green gradation value Ig as follows.

$$I(g)=Ig-I(w)$$

The blue gradation value I(b) is set by subtracting the white gradation value I(w) from the blue gradation value Ib as follows.

$$I(b)=Ib-I(w)$$

In 256 gradation (the maximum gradation value 255 is set as 100%), for a case where all of Ir, Ig, and Ib are equal to or greater than the set gradation value 50 (19.6%≈20%), as a result of testing changes in the visible conditions of the colors due to the machining errors by a plurality of persons, the hue is remarkably changed when A/100 is less than 0.3 and A/100 is greater than 0.7. Thus, it is necessary to set A/100 to be equal to or greater than 0.3 and equal to or less than 0.7.

Figure 6:
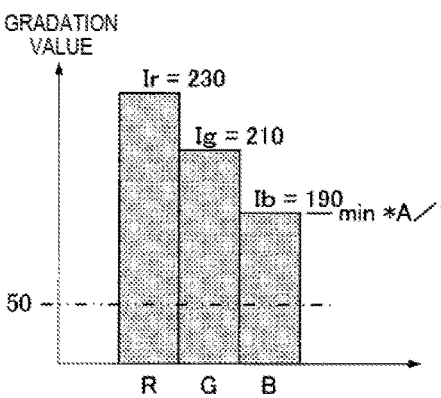
FIG. 6 is a diagram for explaining; (a) the gradation, values Ir, Ig, and Ib of the display color in a case where the display color is a skin color in a specific example illustrated in FIG. 5; and (b) that the R, G, and B gradation values are converted into: the R, G, B, and W gradation values I(r), I(g), I(b), and I(w).

FIG. 6 illustrates specific examples in which all of Ir, Ig, and Ib are equal to or greater than the set gradation value 50 within the maximum gradation, value 255.

In a case where the display color close to the specific color is a skin color, as illustrated in FIG. 6, the R, G and B gradation values Ir, Ig, and Ib are as follows: Ir=230, Ig=210, and Ib=190. An example in which the R, G and B gradation values Ir, Ig, and Ib are converted into R, G, B, and W gradation values is illustrated in FIG. 6. FIG. 6 illustrates an example in which the R, G and B gradation values Ir, Ig, and Ib are converted into R, G, B, and W gradation values I(r), I(g), I(b) and I(w) when A/100 is set to 0.5 within the range from 0.3 to 0.7 inclusive.

The R, G, B, and W gradation values I(r), I(g), I(b) and I(w) are as follows.

$$I(w)=\min(230,210,190)\times 0.5=95$$

$$I(r)=230-95=135$$

$$I(g)=230-95=115$$

$$I(b)=190-95=95$$

As described above, the gradation values obtained by subtracting the white gradation value from the red, green, and blue gradation values Ir, Ig, and Ib are converted into the red, green, and blue gradation values I(r), I(g), and I(b). Design pattern 4 divided into red, green, blue and white components is formed in a shape of the array of fine shapes 5.

A method of forming the design pattern will be described in detail with reference to FIGS. 7 to 13.

Figure 7:
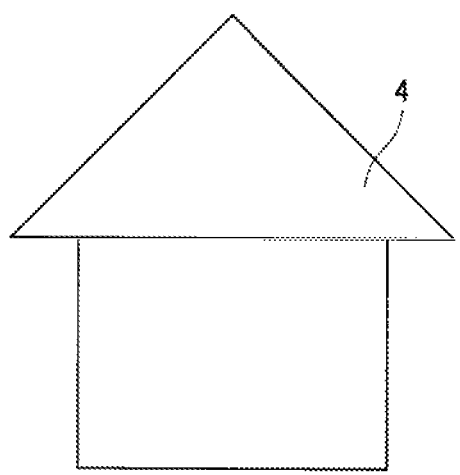
FIG. 7 is a diagram illustrating an example of a design pattern in the embodiment 1.

FIG. 7 illustrates a portion of design pattern 4 illustrated, in FIG. 1.

Figure 8A:
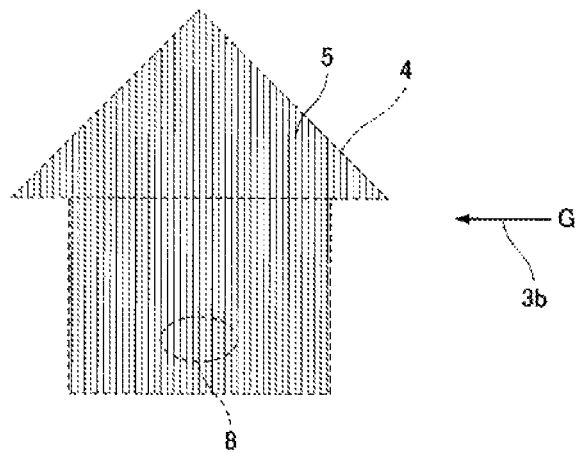
FIG. 8A is a plan view illustrating light incident directions for a green color arrangement of the design pattern in the embodiment 1.
Figure 8B:
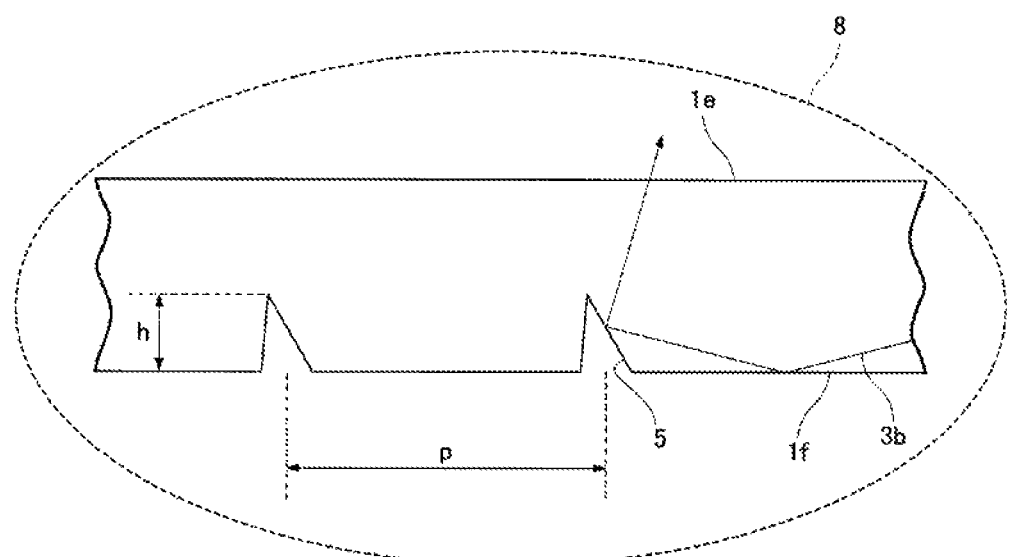
FIG. 8B is an enlarged sectional view illustrating the fine shapes formed on the light guide body.

FIG. 8A Illustrates a method of forming the design pattern corresponding to the incident light in a case where green (G) light 3b is incident into light guide body 1 from the right side. FIG. 8B is a sectional view of portion 8 illustrated in FIG. 8A, and illustrates the enlarged array of fine shapes 5 that reflect light. As illustrated in FIG. 8B, fine shape 5 that reflects green light 3b is configured with a linear prism which has a triangular cross section and a ridgeline in a direction substantially perpendicular to the incident direction of incident light 3b. The green light 3b reflected by fine shape 5 illustrated, in FIG. 8B is emitted from light emission surface 1e. The gradation value is controlled by height h of fine shape 5 or pitch p of fine shapes 5.

FIG. 9A illustrates a method of forming the design pattern corresponding to the incident light in a case where blue (B) light 3c is incident from the upper of light guide body 1. FIG. 9B is a sectional view of portion 8 illustrated in FIG. 9A, and illustrates the enlarged array of fine shapes 5 that reflect light. As illustrated in FIG. 9B, fine shape 5 that reflects blue light 3c is configured with a linear prism, which has a triangular cross section and a ridgeline in a direction substantially perpendicular to the incident direction of incident light 3c. The blue light 3c reflected by fine shape 5 illustrated in FIG. 9B is emitted from light emission surface 1e. The gradation, value is controlled by height h of fine shape 5 or pitch p of fine shapes 5.

Figure 10A:
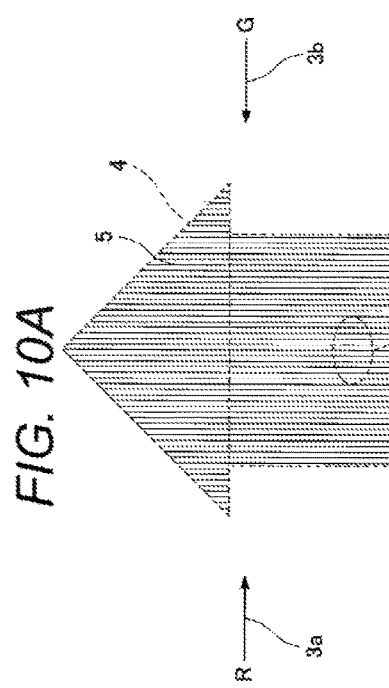
FIG. 10A is a plan view illustrating light incident directions for a red and a green color arrangement of the design pattern in the embodiment 1.
Figure 10B:
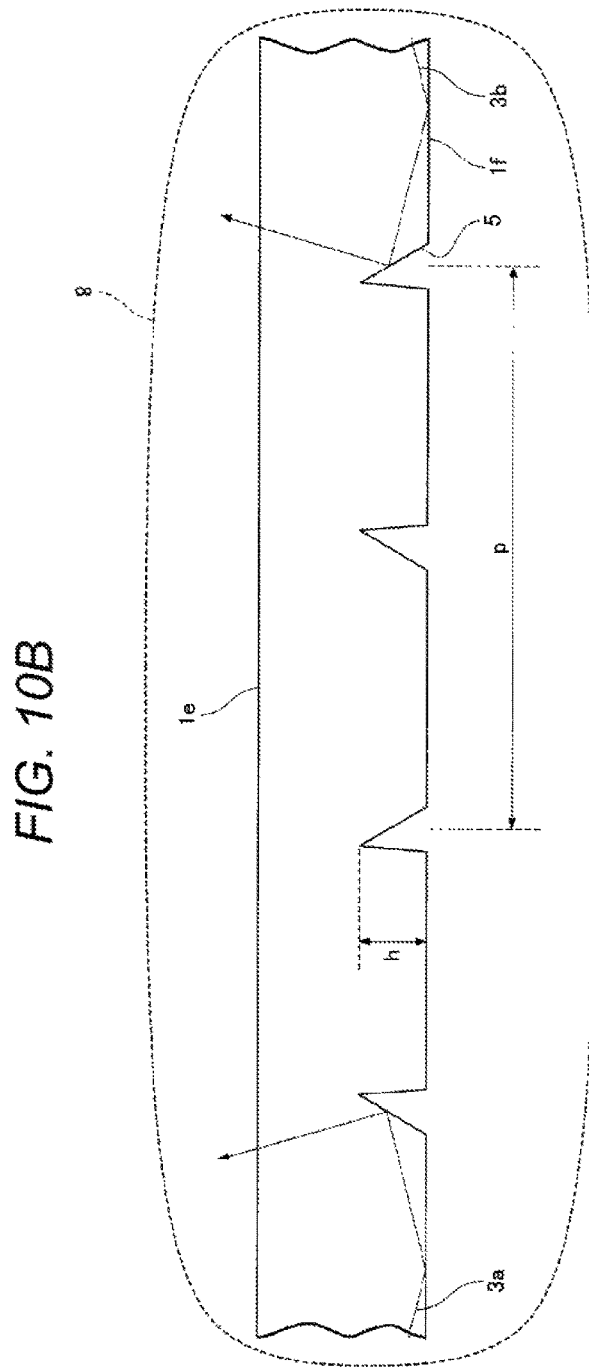
FIG. 10B is an enlarged sectional view illustrating the fine shapes formed en the light guide body.

FIG. 10A illustrates a method of forming the design pattern corresponding to the incident light in a case where green (G) light 3b is incident into light guide body 1 from the right side and red (R) light 3a is incident into light guide body 1 from the left side. FIG. 10B is a sectional view of portion 8 illustrated in FIG. 10A, and illustrates the enlarged array of fine shapes 5 that reflect light.

Fine shape 5 that reflects green light 3b is configured with a linear prism which has a triangular cross section and a ridgeline in a direction substantially perpendicular to the incident direction of incident light 3b. The green light 3b reflected by fine shape 5 illustrated in FIG. 10B is emitted from light emission surface 1e. Fine shape 5 that reflects red light 3a is configured with a linear prisim which has a triangular cross section and a ridgeline in a direction substantially perpendicular to the incident direction of incident light 3a. The red light 3a reflected by fine shape 5 illustrated in FIG. 10B is emitted from light emission surface 1e. The gradation value is controlled by height h of fine shape 5 or pitch p of fine shapes 5.

In this way, fine shape 5 that reflects green light 3b and fine shape 5 that reflects red light 3a are mixed and disposed.

Figure 11A:
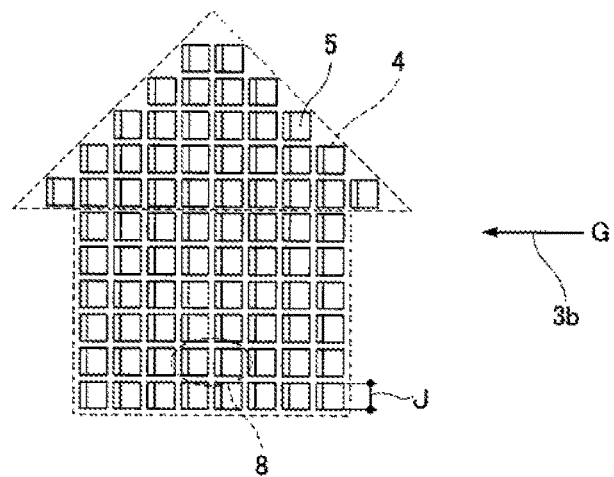
FIG. 11A is a plan view illustrating light incident directions for a green color arrangement of the design pattern in the embodiment 1.
Figure 11B:
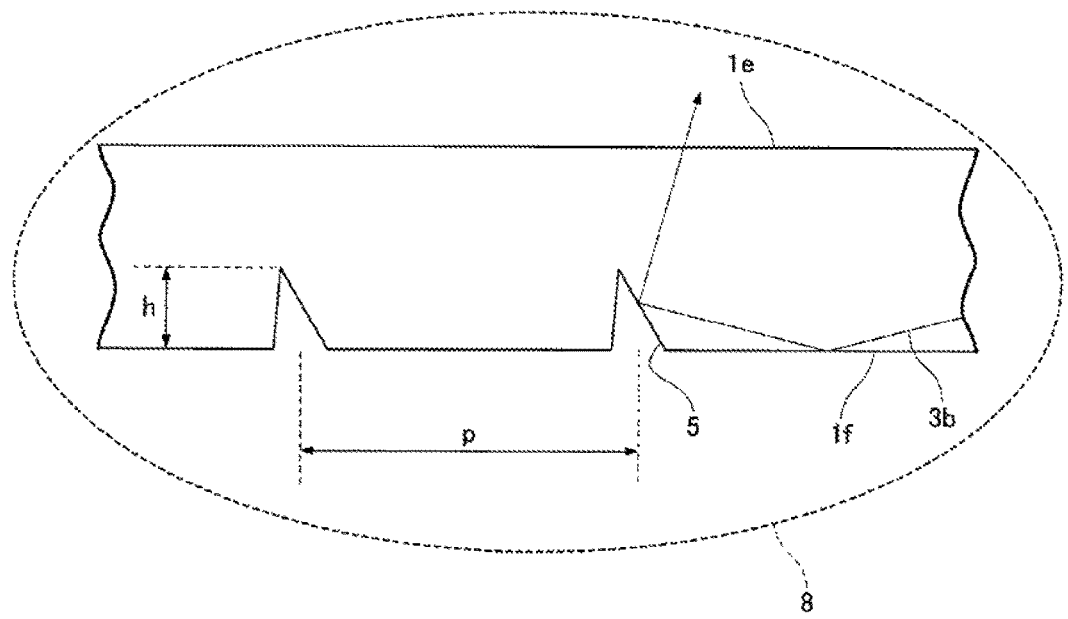
FIG. 11B is an enlarged sectional view illustrating the fine shapes formed on the light guide body.

FIG. 11A illustrates another method of forming the design pattern corresponding to the incident light in a case where green (G) light 3b is incident into light guide body 1 from the right side. In FIGS. 5 to 10, fine shape 5 that reflects light is configured with a linear long-length prism which has a triangular cross section and a long length in the longitudinal direction. In contrast FIG. 11A illustrates a case where design pattern 4 is formed using fine shapes 5 configured with short-length prisms which have a triangular cross section and a short length J in the longitudinal direction. FIG. 11B is a sectional view of portion 8 illustrated in FIG. 11A, and green light 3b is reflected by fine shape 5 and emitted from light emission surface 1e. The gradation value is controlled by height h of fine shapes 5 or pitch p of fine shapes 5.

Figure 12:
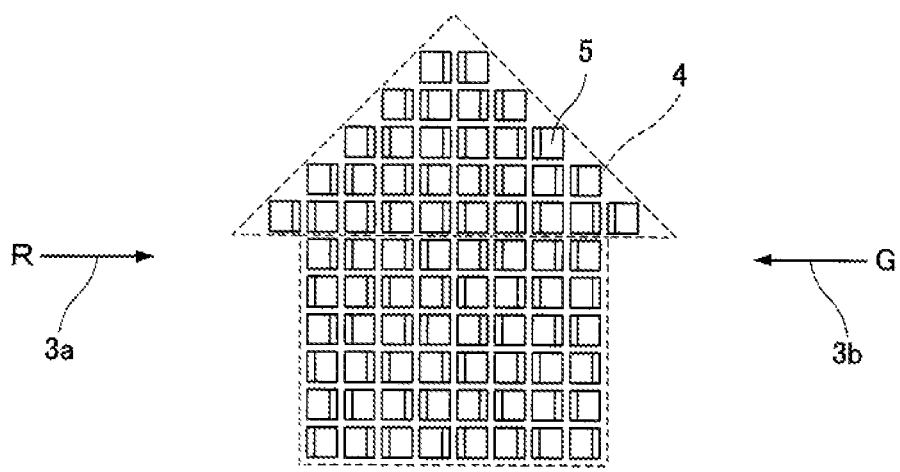
FIG. 12 is a plan view illustrating light incident directions for a red color arrangement and a green color arrangement of the design pattern in the embodiment 1.

FIG. 12 illustrates an example in which light beams that are different from each other are incident from two opposite directions in a case where the design pattern is formed using short-length prisms having a triangular cross section. Fine shapes 5 are mixed and disposed so as to respectively reflect incident light beams 3a and 3b by the reflection surfaces that respectively reflect the incident light beams.

Figure 13:
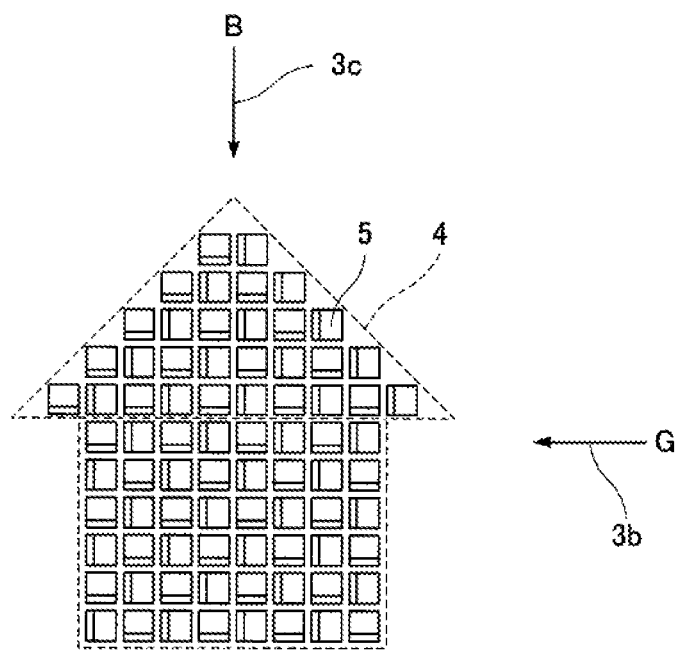
FIG. 13 is a plan view illustrating light/incident directions for a green color arrangement and a blue color arrangement of the design pattern in the embodiment 1.

FIG. 13 illustrates an example in which light beams that are different from each other are incident from two orthogonal directions in a case where the design pattern is formed using short-length prisms having a triangular cross section. Fine shapes 5 are mixed and disposed so as to respectively reflect, green light 3b and blue light 3c by the reflection surfaces that respectively reflect the incident light beams.

In the design pattern forming methods described with reference to FIGS. 7 to 13, although the design pattern corresponding to the incident light beams from one direction, or two directions is formed, it is possible to form design pattern 4 corresponding to the incident light beams from three directions or four directions by the combination of the methods, the incident light beams having different colors from each other.

For example, it is possible to form design pattern 4 corresponding to the incident light beams having four different colors of red, green, blue and white, the green light beam being incident into light guide body 1 from the right side, the blue light beam being incident from the upper side of light guide body 1, the red light beam being incident into light guide body 1 from the left side, and the white light beam being incident from the lower side of light guide body 1.

The design pattern may be formed by disposing the linear prisms illustrated in FIG. 8A that have a triangular cross section at a portion of the design pattern, and by disposing the short-length prisms illustrated in FIG. 11A that have a triangular cross section at the other portions in combination with each other.

The gradation value is controlled by converting height h of fine shapes 5 or pitch p that is the distance between the vertexes of adjacent prisms of fine shapes 5 having a triangular cross section. For example, for a point having a high gradation value, height h of the fine shapes is increased or pitch p of fine shapes 5 is decreased. The red, green, blue and white light beams are incident from each side surface of light guide body 1 so as to correspond to the reflection surfaces of fine shapes 5, and thus it is possible to display a beautiful color image or a beautiful, multicolor image having high color reproducibility.

In the above description, although fine shape 5 that reflects light has a triangular cross section, the same effect can be obtained even when fine shape 5 has a trapezoid cross section.

As the design pattern is positioned farther from the light source, height h of fine shapes 5 as reflectors is set to be higher than the height of the fine shapes that is calculated from the converted white, red, green, and blue gradation, values I(w), I(r), I(g), and I(b), or pitch p of fine shapes 5 is set to be shorter than pitch p of the fine shapes that is calculated from the converted white, red, green, and blue gradation values I(w), I(r), I(g), and I(b). Therefore, it is possible to prevent in-plane unevenness of light intensity, and thus color unevenness can be reduced.

Fine shape 5 that reflects white light is the same as the fine shape obtained by inverting the top and the bottom of FIG. 9B. The gradation values are controlled by converting height h of fine shapes 5 or pitch p of fine shapes 5.

It is possible to display a beautiful white color while preventing white color from being viewed in any other color, by using a white light source in addition to the red, green, and blue light sources.

In the description of FIG. 1, the blue light is incident from the upper of light guide body 1, the green light is incident into light guide body 1 from the right side, the red light is incident into light guide body 1 from the left side, and the white light is incident from the lower side of light guide body 1. However, the incident direction of each color light is not limited thereto.

That is, preferably, the incident direction of each color light is determined according to the color arrangement of design pattern 4 as follows.

In the relationship between each side surface of light guide body 1 and the color of the incident light which is incident into each side surface of light guide body 1, preferably, each of red, blue, green, and white light is incident from the side surface close to the portion where each of red, blue, green, and white components are mainly included in the color arrangement of the color display of design pattern 4. Specifically, as in the case of the landscape design pattern illustrated in FIG. 1, in a case where the blue color of the sky is mainly included at the upper portion of light guide body 1, where the green color of the tree is mainly included at the right portion of light guide body 1, and where the red color of the sun is mainly included at the left portion of light guide body 1, according to the color arrangement, blue light is incident from upper side surface 1c of light guide body 1, green light is incident from right side surface 1b of light guide body 1, and red light is incident from left side surface 1a of light guide body 1. Thereby, beautiful color display can be realized.

Further, in a case where the fine shapes for each color are formed so as to have the gradation values I(r), I(g), I(b), and I(w) calculated based on the color separation method of the embodiment 1, even when white light 3d is not incident into light guide body 1 due to the failure of light source 2D, the color becomes darker than the color to be displayed, but the ratio between the gradation values I(r), I(g), and I(b) does not change. Thus, a change in the hue of the specific color can be eliminated.

Embodiment 2

In the embodiment 1, a case where all of the red, green, and blue gradation values Ir, Ig, and Ib of the color to be displayed are equal to or greater than the gradation value 50 within the maximum gradation value 255 is described. However, as illustrated in FIG. 14A, in a case where at least one of Ir, Ig and Ib is less than the gradation value 50 within the maximum gradation value 255, it is preferable to form the fine shapes for each color so as to have the gradation values I(r), I(g), I(b) and I(w) illustrated in FIG. 14B.

Figure 14A:
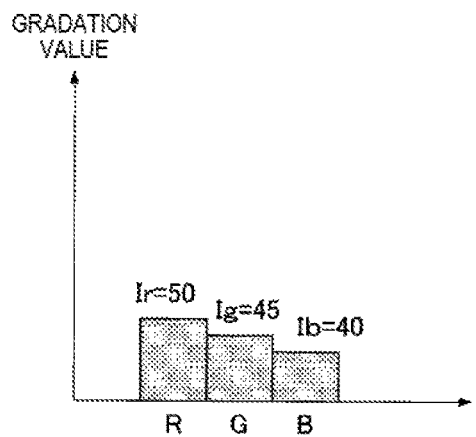
FIG. 14A is a diagram for explaining R, G, and B gradation values of a brown color in an embodiment 2.

FIG. 14A illustrates a case where at least one of the gradation values is less than the gradation value 50 within the maximum gradation value 255. In this example, the gradation values Ig and Ib are less than the gradation value 50. In this case, when it is assumed that A/100=0, I(w) is as follows.

$$I(w) = \min(Ir, Ig, Ib) \cdot A/100$$
$$= Ib \cdot A/100$$
$$= 0$$

The gradation values Ir, Ig, and Ib are adopted as I(r), I(g), and I(b) without any change, and thus I(r), I(g), and I(b) are as follows.

I(r)=Ir
I(g)=Ig
I(b)=Ib

Thereby, it is possible to reduce a change in the hue.

For example, in a color having a gradation, value less than, the gradation value 50 within the maximum gradation value 255, when it is assumed that the height of fine shape 5 of the color for obtaining the maximum gradation value: corresponds to 10 μm, even, in the case of max(Ir, Ig, Ib)=50, the height of the fine shape is 10 μm×50/256=1.95 μm. The machining error is an error which cannot be prevented even when machining with high precision is performed. Since the machining error with a length of several microns may occur in some cases, when forming the fine shape with a height of 1.95 μm, the groove of the fine shape may not be formed accurately due to the machining error. For this reason, there is a case where the desired hue cannot be displayed at the corresponding portion of the light guide plate.

As described in the embodiment 1, when the gradation values are converted into I(r), I(g), I(b) and I(w), the height of the fine shape becomes smaller than 1.95 µm, and as a result, there is a high possibility that the groove: of the fine shape is not formed due to the machining error. Therefore, as in the case where at least one of the red, green, and blue gradation, values is less than the gradation value 50, in a case where the fine shape of any one color of red, green, and blue has a low height, it is preferable to use the red, green, and blue gradation values Ir. Ig, and Ib as without any change.

The specific example illustrated in FIG. 14A corresponds to a case of brown color, and the red, green, and blue gradation values Ir, Ig, and Ib of the color are as follows.

Ir=50
Ig=45
Ib=40

Figure 14B:
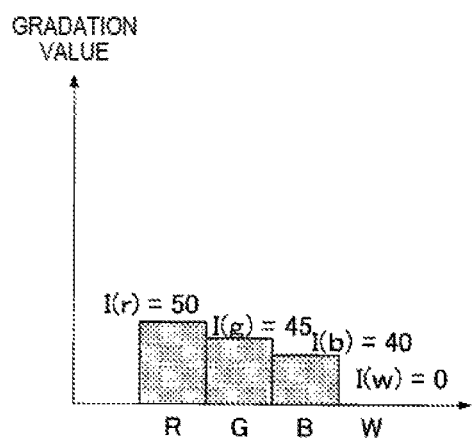
FIG. 14B is a diagram for explaining that the R, G, and B gradation values are converted into R, G, B, and W gradation values.

In this case, as illustrated in FIG. 14B, height h of fine shapes 5 or pitch p that is the distance between the vertexes of adjacent prisms of fine shapes 5 having a triangular cross section is controlled to be converted into a height or a pitch which corresponds to the gradation values I(w), I(r), I(g) and I(b) as follows.

I(w)=0
I(r)=50
I(g)=45
I(b)=40

As described above, in a case where the original red, green, and blue components are in low level, the components are not separated into white components, and thus it is possible to display beautiful colors while preventing a change in the hue due to the machining error.

Although the example of brown color is described, the embodiment 2 is also effective for dark red, dark green and dark blue.

Embodiment 3

In the embodiment 1, in a case where all of the red, green, and blue gradation values Ir, Ig, and Ib of the color to be displayed are equal to or greater than the gradation value 50, an example of gradation conversion is described. In contrast, in this embodiment, in the case of a color without the gradation values, the color in which the gradation difference between the gradation values Ir, Ig, and Ib is equal to or lower than 5% is regarded as white, and the gradation values Ir, Ig, and Ib are converted into I(w), I(r), I(g) and I(b) as follows.

I(w)=max (Ir, Ig, Ib)
I(r)=0
I(g)=0
I(b)=0

Thereby, it is possible to ensure a beautiful white color.

Specifically, in all colors in which the gradation values Ir, Ig, and Ib are in a range from 0 to 255 inclusive within the maximum gradation value 255, the color in which the value obtained by the following expression is in a range from 0% to 5% inclusive, that is, the color in which the gradation difference between the red, green, and blue gradation values Ir. Ig, and Ib is equal to or lower than 5% is regarded as white, and gradation conversion is performed.

$$\{\max(Ir,Ig,Ib)-\min(Ir,Ig,Ib)\}/\min(Ir,Ig,Ib)\cdot 100$$

As a result of testing changes in the visible conditions of red, green, and blue colors for a plurality of persons by changing the gradation values of each color from a white color in which the red, green, and blue gradation values are the same, from the testing results, it is found that, when the difference between the maximum gradation value and the minimum gradation value of red, green and blue exceeds 5%, the colors are not viewed as a white color. Therefore, the color in which the gradation difference between the red, green, and blue gradation values Ir, Ig, and Ib is equal to or higher than 0% and equal to or lower than 5% can be regarded as white.

Figure 15:
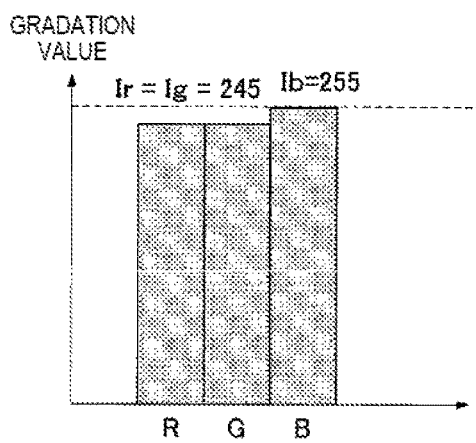
FIG. 15 is a diagram for explaining: (a) R, G and B gradation values of the color in which the gradation difference between the R, G, and B gradation values is equal to or lower than 5% in an embodiment 3; and (b) that the R, G, and B gradation values are converted into R, G, B, and W gradation values.
Figure 15:
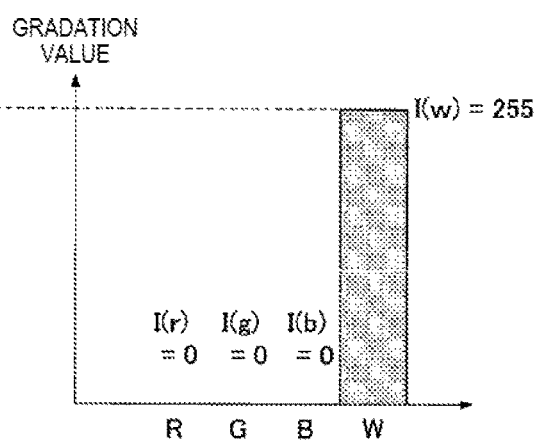
Figure 16:
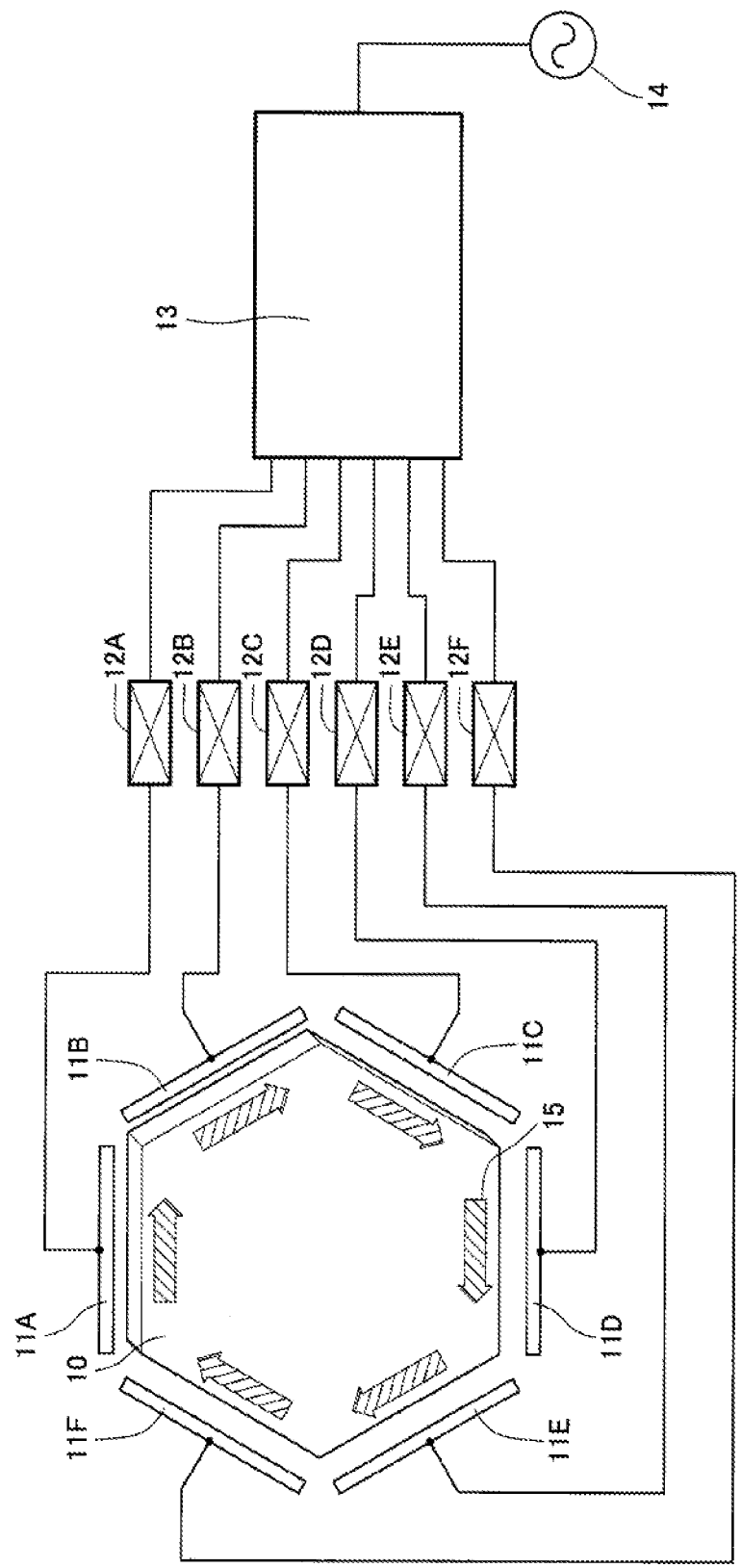
FIG. 16 is a diagram illustrating the configuration of a multicolor display apparatus in the related art.

FIG. 15 illustrates an example of converting the gradation values of a slightly bluish sky color using Ir=Ig=245 and Ib=255. In red, green, and blue colors in which all of the red, green, and blue gradation values are equal to or greater than the gradation value 50, the gradation difference between the red, green, and blue gradation values is as follows.

$$\{\max(245,245,255)-\min(245,245,255)\}/\min(245,245,255)\times 100=\{255-245\}/245\times 100=4\%$$

Therefore, as illustrated in FIG. 15, in the case of the color being viewed as a white color, the color is not separated into red, green, and blue components. In fine shapes 5 for each color, height h of fine shapes 5 or pitch p that is the distance between the vertexes of adjacent prisms of fine shapes 5 having a triangular cross section is controlled to be converted into a height or a pitch which corresponds to the gradation values I(w), I(r), I(g) and I(b) as follows.

I(w)=max(245, 245, 255)=255
I(r)=0
I(g)=0
I(b)=0

Thereby, it is possible to display a beautiful white color while preventing the white color from, being colored with any other color.

In red, green, and blue colors in which ail of the red, green, and blue gradation values are equal to or less than the gradation value 50, the color in which the gradation difference between the red, green, and blue gradation, values is equal to or lower than 5% is regarded as gray, and the gradation values of the color are converted into I(w)=max (Ir, Ig, Ib), I(r)=0, I(g)=0, I(b)=0. Thereby, it is possible to ensure a beautiful gray color.

Embodiment 4

In this embodiment, the embodiments 2 and 3 are executed simultaneously with the embodiment 1. Thus, it is possible to realize a design with more beautiful white color and more beautiful other colors.

Further, it is possible to realize a design with more beautiful white color and mere beautiful other colors by executing the embodiments 1, 2, and 3 simultaneously.

The embodiments can be applied to display panels of various electric appliances, display panels of game devices, display panels of signage, or the like.

What is claimed is:

1. A multicolor display apparatus comprising:
a light guide body on which a design pattern is formed by arrays of fine shapes; and
light sources from which red, green, blue, and white light beams are incident into the inside of the light guide body,
wherein the multicolor display apparatus displays the design pattern by reflecting the light beams which are incident into the light guide body and guided by the arrays of fine shapes and emitting the reflected light beams from the light emission surface of the light guide body, and
wherein,
a first set of gradation values of red, green, blue, and white at a point where a specific color of the design pattern of the light guide body is displayed using red, green, blue, and white light are set as I(r), I(g), I(b), and I(w), respectively, a second set of gradation values of red, green, and blue in the case of displaying a color close to the specific color using only red, green, and blue light without white light are set as Ir, Ig, and Ib, respectively, the fine shapes for each of red, green, blue, and white colors have a height or a pitch which corresponds to the first set of gradation values, the first set of gradation values is converted from the second set of gradation values, and in a case where a maximum gradation value is set as 100%, when all of Ir, Ig, Ib are equal to or greater than a set gradation value around 20%, the first set of gradation values is converted from the second set of gradation values as follows, $$I(w)=\min(Ir,Ig,Ib) \times A/100$$

$$I(r)=Ir-I(w)$$

$$I(g)=Ig-I(w)$$

$$I(b)=Ib-I(w)$$

where A is a numerical value less than 100, and A/100 being less than 1.

2. The multicolor display apparatus of claim 1, wherein A/100 is equal to or greater than 0.3 and equal to or less than 0.7.

3. The multicolor display apparatus of claim 1, wherein A/100 is set to "0" in a case where at least one of the gradation values Ir, Ig, and Ib is less than the set gradation value around 20%, the fine shapes for each of red, green, blue, and white colors have a height or a pitch which corresponds to the gradation values as follows I(w)=0
I(r)=Ir
I(g)=Ig
I(b)=Ib.

4. A multicolor display apparatus comprising:

a light guide body on which a design pattern is formed by arrays of fine shapes; and light sources from which red, green, blue, and white light beams are incident into the inside of the light guide body, wherein the multicolor display apparatus displays the design pattern by reflecting the light beams which are incident into the light guide body and guided by the arrays of fine shapes and emitting the reflected light beams from the light emission surface of the light guide body, a first set of gradation values of red, green, blue, and white at a point where a specific color of the design pattern of the light guide body is displayed using red, green, blue, and white light are set as I(r), I(g), I(b), and I(w), respectively, a second set of gradation values of red, green, and blue in the case of displaying a color close to the specific color using only red, green, and blue light without white light are set as Ir, Ig, and Ib, respectively, the fine shapes for each of red, green, blue, and white colors have a height or a pitch which corresponds to the first set of gradation values, the first set of gradation values is converted from the second set of gradation values, and in a case where a maximum gradation value is set as 100%, and the gradation difference between the gradation values Ir, Ig, and Ib is equal to or less than 5%, the first set of gradation values is converted from the second set of gradation values and the fine shapes for each of red, green, blue, and white colors have a height or a pitch which corresponds to the first set of gradation values as follows I(w)=max(Ir, Ig, Ib)
I(r)=0
I(g)=0
I(b)=0.

5. A method for setting gradation values of a multicolor display apparatus, comprising:

providing a light guide body on which a design pattern is formed by arrays of fine shapes;

providing light sources from which red, green, blue, and white light beams are incident into the inside of the light guide body;

at the timing of setting the fine shapes for displaying the design pattern with a specific color by reflecting the light beams which are incident into the light guide body and guided by the arrays of fine shapes and emitting the reflected light beams from the light emission surface of the light guide body, a first set of gradation values of red, green, and blue in the case of displaying a display color close to the specific color using only red, green, and blue light inside the light guide body are set as Ir, Ig, and Ib, respectively, and a second set of gradation values of red, green, blue, and white in the case of displaying the specific color using red, green, blue, and white light inside the light guide body are set as I(r), I(g), I(b), and I(w), respectively, converting the first set of gradation values Ir, Ig, and Ib into the second set of gradation values, in a case where a maximum gradation value is set as 100%, when all of Ir, Ig, Ib are equal to or greater than a set gradation value around 20%, the first set of gradation values is converted into the second set of gradation values as follows $$I(w)=\min(Ir,Ig,Ib) \times A/100$$

$$I(r)=Ir-I(w)$$

$$I(g)=Ig-I(w)$$

$$I(b)=Ib-I(w),$$

where A is a numerical value less than 100, and A/100 being less than; and converting the converted gradation values into a height or a pitch of the fine shapes, and forming the design pattern based on the height or the pitch of the fine shapes.

6. The method for setting gradation values of a multicolor display apparatus of claim 5, wherein A/100 is equal to or greater than 0.3 and equal to or less than 0.7.

7. The method for setting gradation values of a multicolor display apparatus of claim 5, wherein, in the fine shapes for each of red, green, blue, and white colors, A/100 is set to "0" for a case where at least one of Ir, Ig, and Ib is less than the set gradation value around 20%, the gradation values Ir, Ig, and Ib are converted into the gradation values I(r), I(g), I(b), and I(w) as follows, I(w)=0

I(r)=Ir
I(g)=Ig
I(b)=Ib, and
the converted gradation values are converted into a height or a pitch of the fine shapes, and the design pattern is formed based on the height or the pitch of the fine shapes.

8. A method for setting gradation values of a multicolor display apparatus, comprising:
providing a light guide body on which a design pattern is formed by arrays of fine shapes;
providing light sources from which red, green, blue, and white light beams are incident into the inside of the light guide body;
at the timing of setting the fine shapes for displaying the design pattern with a specific color by reflecting the light beams which are incident into the light guide body and guided by the arrays of fine shapes and emitting the reflected light beams from the light emission surface of the light guide body,
a first set of gradation values of red, green, and blue in the case of displaying a display color close to the specific color using only red, green, and blue light inside the light guide body are set as Ir, Ig, and Ib, respectively,
a second set of gradation values of red, green, blue, and white in the case of displaying the specific color using red, green, blue, and white light inside the light guide body are set as I(r), I(g), I(b), and I(w), respectively,
converting the first set of gradation values Ir, Ig, and Ib into the second set of gradation values,
wherein, in the fine shapes for each of red, green, blue, and white colors,
in a case where gradation difference between Ir, Ig, and Ib is equal to or less than 5%,
the gradation values Ir, Ig, and Ib are converted into the gradation values I(r), I(g), I(b), and I(w) as follows,
I(w)=max(Ir, Ig, Ib)
I(r)=0
I(g)=0
I(b)=0
and the converted gradation values are converted into a height or a pitch of the fine shapes, and the design pattern is formed based on the height or the pitch of the fine shapes.

9. A method for setting gradation values of a multicolor display apparatus including a RGBW light guide body on which a design pattern is formed by arrays of fine shapes and light sources from which red, green, blue, and white light beams are incident into the inside of the light guide body, the method comprising:
converting first gradation values associated with red, green, and blue in the case of displaying a display color close to a specific color using only red, green, and blue light inside a RGB light guide body into second gradation values associated with red, green, blue, and white for the RGBW light guide body, the converting further including:
labeling the first gradation values associated with red, green, and blue as Ir, Ig, and Ib, respectively, and the second gradation values of red, green, blue, and white as I(r), I(g), I(b), and I(w), respectively;
in a case where a maximum gradation value is set as 100%, when all of Ir, Ig, Ib are equal to or greater than a set gradation value around 20%, converting the first gradation values Ir, Ig, and Ib into the second gradation values as follows, $$I(w)=\min(Ir,Ig,Ib) \times A/100$$

$$I(r)=Ir-I(w)$$

$$I(g)=Ig-I(w)$$

$$I(b)=Ib-I(w)$$

where A is a numerical value less than 100, and A/100 being less than; and
assigning a height or a pitch of the arrays of fine shapes in accordance with the second gradation values to form the design pattern.

* * * * *